US008118129B2

(12) United States Patent
Ito et al.

(10) Patent No.: US 8,118,129 B2
(45) Date of Patent: Feb. 21, 2012

(54) DRAINAGE STRUCTURE IN FUEL CELL MOTORCYCLE

(75) Inventors: Masamoto Ito, Saitama (JP); Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/041,177

(22) Filed: Mar. 3, 2008

(65) Prior Publication Data
US 2008/0217087 A1   Sep. 11, 2008

(30) Foreign Application Priority Data

Mar. 6, 2007   (JP) ................................. 2007-056273

(51) Int. Cl.
*B60K 1/04* (2006.01)
*B60K 13/04* (2006.01)
*B60K 13/06* (2006.01)
*B62D 61/02* (2006.01)

(52) U.S. Cl. ...... 180/225; 180/220; 180/227; 180/65.31
(58) Field of Classification Search .................. 180/220, 180/225, 296, 309, 65.31, 227, 228
See application file for complete search history.

(56) References Cited

U.S. PATENT DOCUMENTS

| 1,413,351 | A | * | 4/1922 | Peters ............................ 180/225 |
| 3,262,413 | A | * | 7/1966 | Douglas et al. ................. 440/46 |
| 4,815,554 | A | * | 3/1989 | Hara et al. ..................... 180/219 |
| 6,715,571 | B2 | | 4/2004 | Nakamori |
| 7,121,366 | B2 | * | 10/2006 | Horii ............................. 180/65.1 |
| 7,401,670 | B2 | | 7/2008 | Horii et al. |
| 2005/0061578 | A1 | * | 3/2005 | Schulte .......................... 181/227 |
| 2005/0067211 | A1 | * | 3/2005 | Inaoka et al. ................. 180/309 |
| 2005/0100777 | A1 | * | 5/2005 | Gurin et al. .................... 429/38 |

(Continued)

FOREIGN PATENT DOCUMENTS

CN   1357465 A   7/2002

(Continued)

OTHER PUBLICATIONS

Richard E. Barrans Jr., Ph.D., Gasoline Combustion, Department of Energy—Ask a Scientist© Chemistry Archive, http://www.newton.dep.anl.gov/askasci/chem99/chem99583.htm, 2 pages.*

*Primary Examiner* — Tony H. Winner
*Assistant Examiner* — Wesley Potter
(74) *Attorney, Agent, or Firm* — Birch, Stewart, Kolasch & Birch, LLP

(57) ABSTRACT

A layout for an exhaust pipe which also serves as a drainage pipe which prevents splashing of water generated in a fuel cell toward a passenger or splashing toward a tire. Humid excessive gas supplied from a fuel cell is diluted in a dilution box by off-gas discharged from the fuel cell and is used for humidifying air in the humidifier. An exhaust pipe is connected to the dilution box, and diluted hydrogen gas is discharged via the exhaust pipe. Vapor mixed in hydrogen gas is condensed in the exhaust pipe and turned into water, which is drained through the exhaust pipe that extends rearwardly of a vehicle body through the interior of a power unit. A discharge port of the exhaust pipe (which is also a drainage port for water generated in the fuel cell) is positioned at the widthwise center of the vehicle body.

15 Claims, 6 Drawing Sheets

U.S. PATENT DOCUMENTS

| | | | |
|---|---|---|---|
| 2005/0191454 A1* | 9/2005 | Kaneko et al. | 428/36.91 |
| 2006/0027407 A1* | 2/2006 | Tsukada et al. | 180/68.1 |
| 2006/0037793 A1* | 2/2006 | Horii et al. | 180/89.2 |
| 2006/0037813 A1* | 2/2006 | Ozeki et al. | 181/272 |
| 2006/0040144 A1* | 2/2006 | Shimizu et al. | 429/12 |
| 2006/0040145 A1* | 2/2006 | Tokumura et al. | 429/12 |
| 2006/0040154 A1* | 2/2006 | Makuta et al. | 429/26 |
| 2006/0070786 A1* | 4/2006 | Mochizuki et al. | 180/227 |
| 2007/0074682 A1* | 4/2007 | Makuta | 123/41.1 |
| 2007/0122671 A1* | 5/2007 | Shimizu et al. | 429/26 |
| 2007/0190278 A1* | 8/2007 | Fukaya et al. | 428/36.91 |

FOREIGN PATENT DOCUMENTS

| | | | |
|---|---|---|---|
| CN | 1736748 A | | 2/2006 |
| JP | 59186737 A | * | 10/1984 |
| JP | 2001-313056 A | | 11/2001 |
| JP | 2003014168 A | * | 1/2003 |

* cited by examiner

DRAINAGE STRUCTURE IN FUEL CELL MOTORCYCLE

CROSS-REFERENCE TO RELATED APPLICATIONS

The present application claims priority under 35 USC 119 to Japanese Patent Application No. 2007-056273 filed on Mar. 6, 2007 the entire contents of which are hereby incorporated by reference.

BACKGROUND OF THE INVENTION

1. Field of the Invention

The present invention relates to a fuel cell motorcycle and, more specifically, to a fuel cell motorcycle having a drainage system for draining water generated in a fuel cell out of a vehicle body.

2. Description of Background Art

A fuel cell is now considered as a way to provide a propulsion for a vehicle while protecting the environment and reserving energy resources as compared to conventional vehicles that require fossil fuel. A fuel cell motorcycle using a motor driven by electric energy generated by the fuel cell as a power source is being developed. When the fuel cell generates electric power, hydrogen ion and electrons are emitted from hydrogen as fuel. The hydrogen ion is combined with oxygen and the electrons are emitted from hydrogen at a cathode to generate water. A drainage system for a fuel cell is disclosed in JP-A-2001-313056. In this drainage system, a drainage port is provided on the side of a vehicle body and water is drained to the side of the vehicle body so as to prevent water from falling on a tire.

In the drainage system disclosed in JP-A-2001-313056, the drainage port is disposed on the side of the vehicle body. Thus, water that is drained therefrom may be splashed toward the legs of a driver or a passenger when they place their legs on the ground. In order to avoid such an event, the flexible layout of the drainage port or a foot step for the passenger or the like becomes difficult. When the drainage port is arranged on the side of the vehicle body, the width of the vehicle is increased, and the appearance of the vehicle body may be impaired by the drainage port exposed on the side of the vehicle. Therefore, in the fuel cell motorcycle, the layout of the drainage port is a problem to solve.

SUMMARY AND OBJECTS OF THE INVENTION

In view of the problem described above, it is an object of an embodiment of the present invention to provide a fuel cell motorcycle having a drainage structure in which the layout of a drainage port for draining water generated in a fuel cell out of a vehicle body is devised, so that an increase in the width of the vehicle and a lowering of the appearance are avoided without splashing water toward the tires or the legs of a passenger.

In order to solve the above-described problem according to an embodiment of the present invention, in a fuel cell motorcycle driven by a motor using electric power generated in a fuel cell as a power source, the fuel cell is arranged forwardly of a rear wheel. A power unit that supports the motor is supported so as to be capable of swinging in the vertical direction with respect to a frame body of the motorcycle. A drainage pipe is connected to the fuel cell for draining out water generated in the interior of the fuel cell and extends rearwardly of the rear wheel through the interior of the power unit. A drainage port is provided at the rear end portion of the drainage pipe.

According to an embodiment of the present invention, a muffler is provided at a midsection of the drainage pipe and stored in the power unit.

According to an embodiment of the present invention, since the drainage port of the drainage pipe is opened rearwardly of the vehicle body, the possibility that discharged water falls on the passenger's leg is eliminated. In addition, since the drainage pipe does not project to the side of the vehicle body, the effect to the angle of the bank is reduced and a preferable appearance is achieved. Since the drainage pipe is arranged in the power unit, a space in the power unit can be effectively used and a more preferable appearance is achieved.

According to an embodiment of the present invention, since the muffler is provided in the power unit, the effect of reducing exhaust noise is increased. In particular, there is an effect to reduce noise generated when water generated in the fuel cell and exhaust air are mixed and discharged together with the exhaust air from the drainage pipe. In addition, since the muffler is stored in the power unit, a good appearance is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
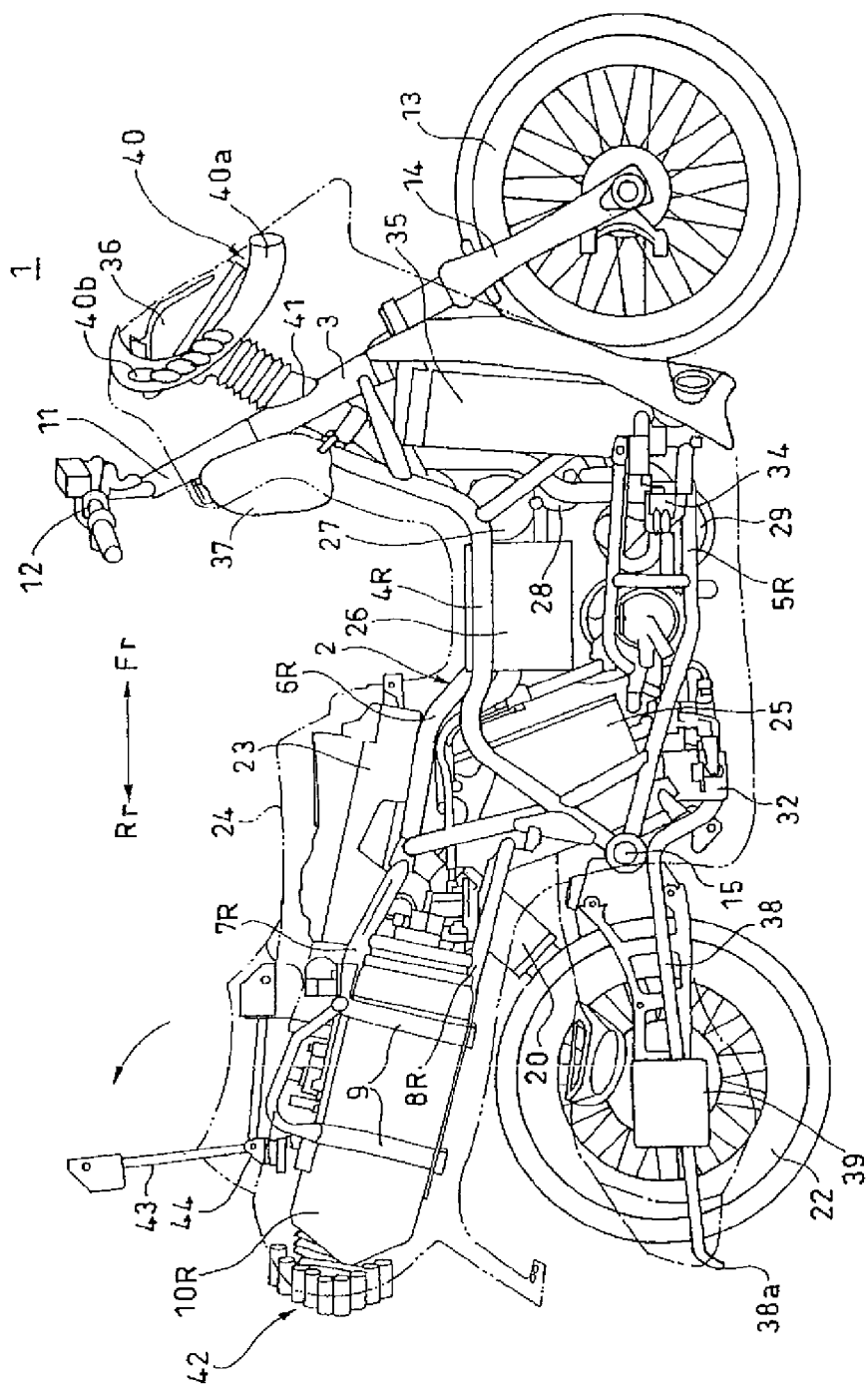
FIG. 1 is a right side view of a fuel cell motorcycle according to an embodiment of the present invention.
Figure 2:
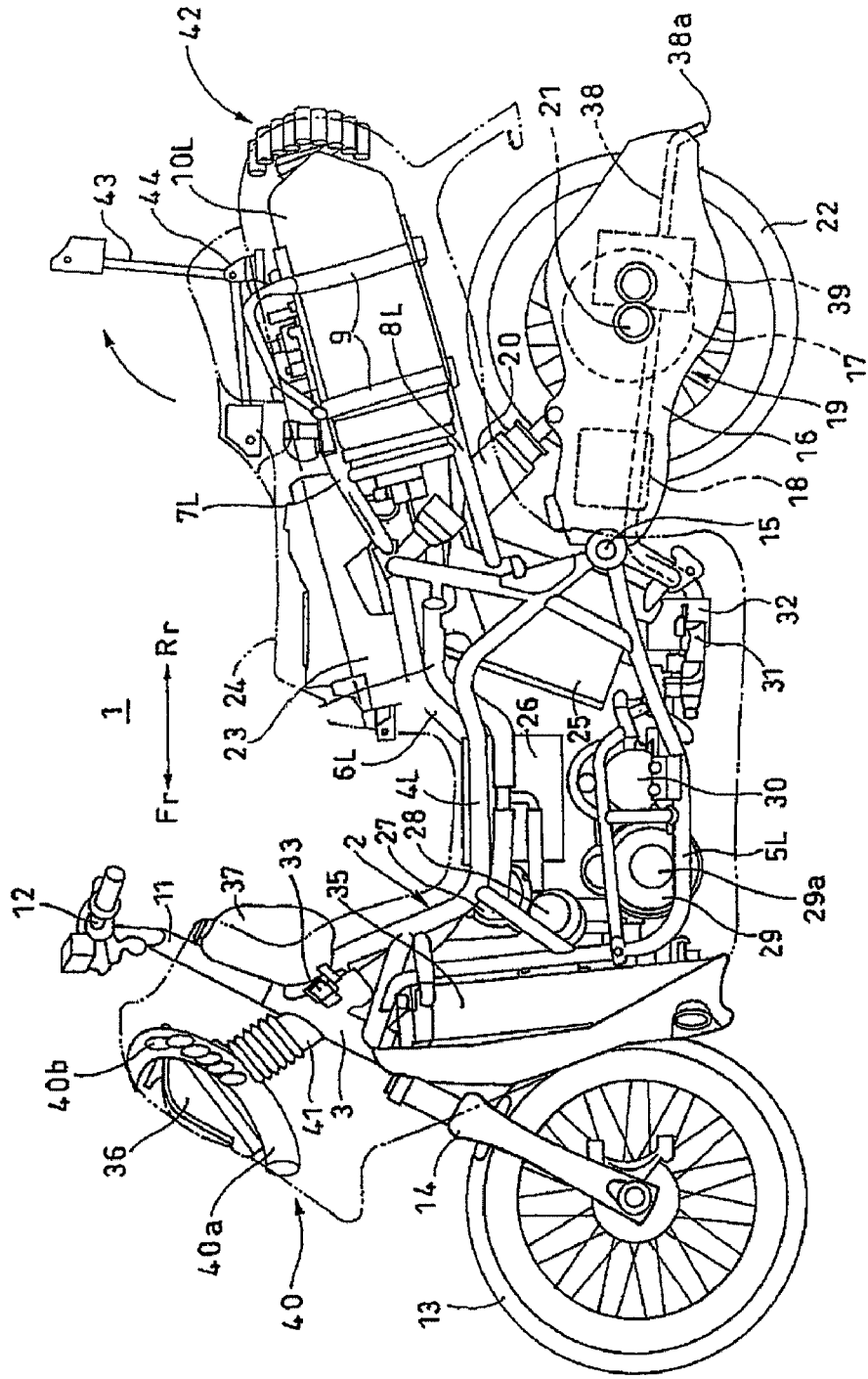
FIG. 2 is a left side view of the fuel cell motorcycle according to the embodiment of the present invention.
Figure 3:
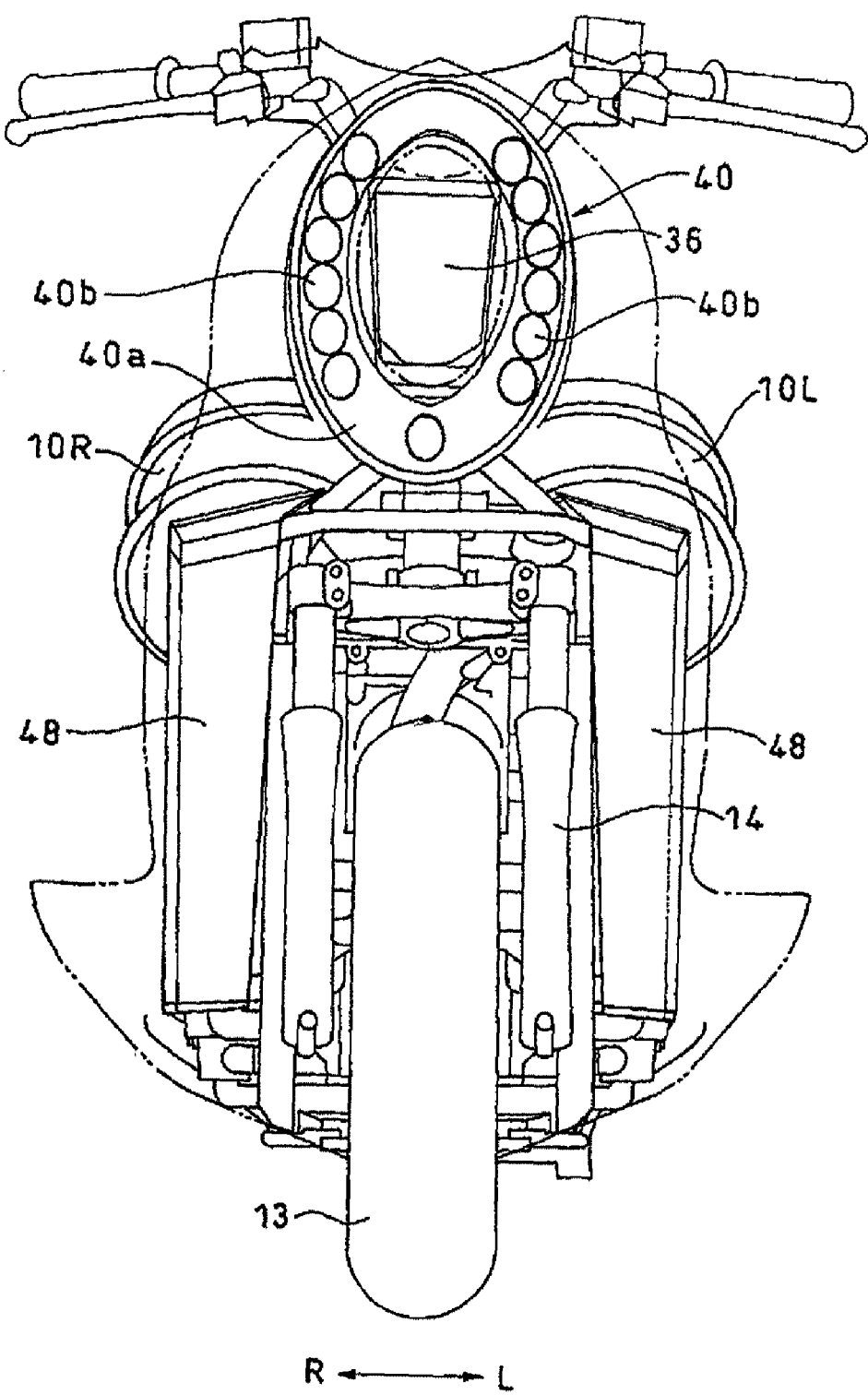
FIG. 3 is a front view of the fuel cell motorcycle according to the embodiment of the present invention.
Figure 4:
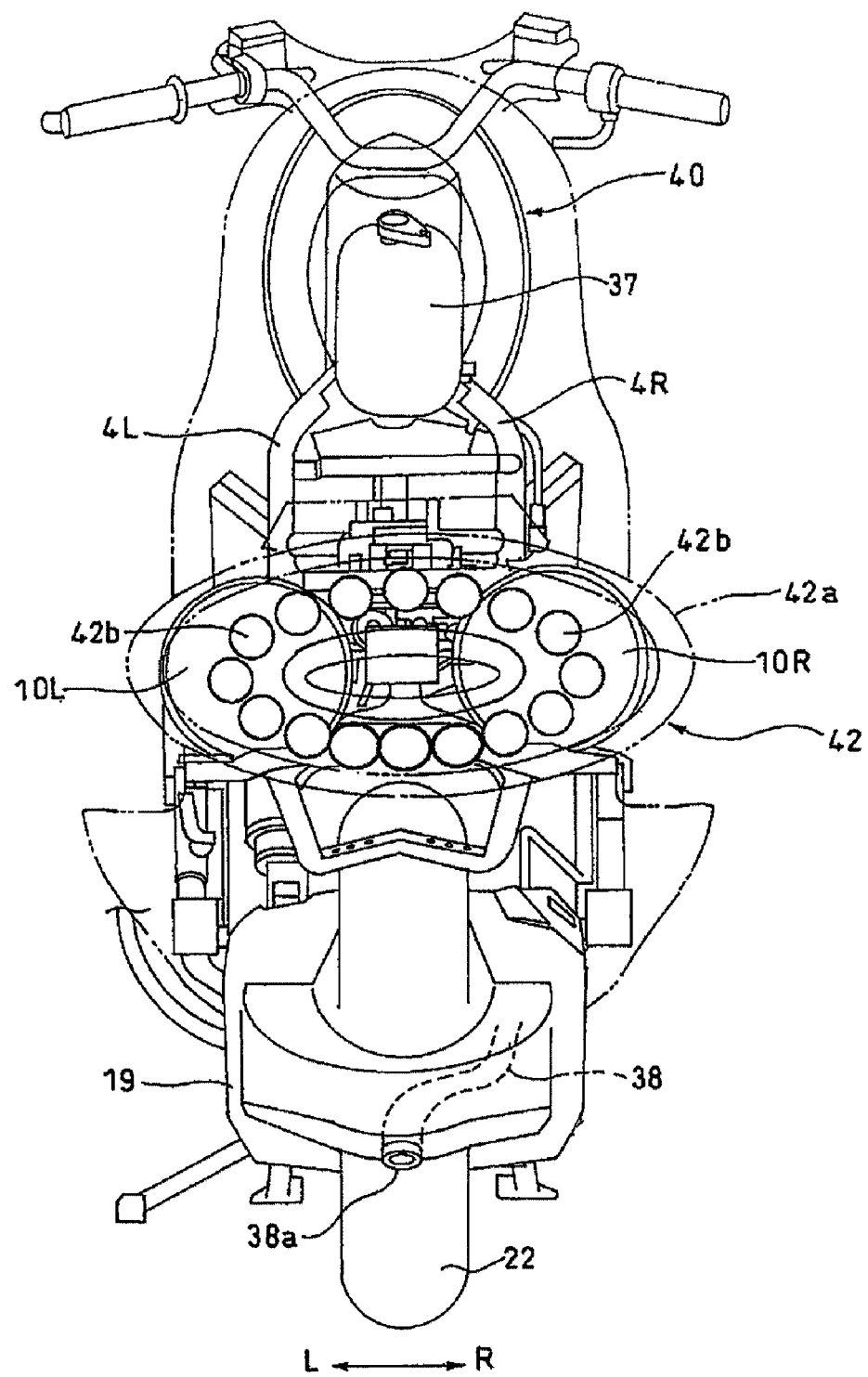
FIG. 4 is a back view of the fuel cell motorcycle according to the embodiment of the present invention.

Referring now to the drawings, an embodiment of the present invention will be described. As illustrated in FIGS. 1 to 4, pairs of left and right parts of a fuel cell motorcycle 1 are distinguished by the designation "L" for those on the left side and the designation "R" for those on the right side. The fuel cell motorcycle has a fuel generator system including a hydrogen supply system, an oxygen supply system and a cell stack (including electrodes, separator, and electrolyte) for generating electric energy through an electrochemical reaction. The cell stack and a casing for storing the same (including members associated with the casing) in combination are referred to as a fuel cell.

A frame body 2 of the fuel cell motorcycle (hereinafter, referred simply to as "motorcycle") 1 includes a head pipe 3, upper frames 4L, 4R and lower frames 5L, 5R being joined at the front ends thereof to the head pipe 3 and extending rearwardly (the direction indicated by a reference sign Rr) of a vehicle body. Rear frames 6L, 6R are joined at the front ends thereof to the upper frames 4L, 4R. The front portions of rear upper sub-frames 7L, 7R are joined to the rear frames 6L, 6R, and the rear ends of the rear lower frames 8L, 8R are joined to the rear portions of the upper frames 4L, 4R. The rear upper sub-frames 7L, 7R, the rear lower sub-frames 8L, 8R and bands 9 whose ends are connected to the rear upper sub-frames 7L, 7R and the rear lower sub-frames 8L, 8R constitute a cylinder holding portion for holding gas cylinders 10L, 10R to the vehicle body. The head pipe 3 rotatably supports a steering stem 11, a handle 12 is joined to the upper end of the steering stem 11, and a front fork 14 for supporting a front wheel 13 is joined to the lower end thereof.

The upper frames 4L, 4R and the lower frames 5L, 5R are joined to each other at the rear ends thereof with a pivot axis 15 being provided at a joint thereof so as to extend horizontally in the direction of width of the vehicle. The pivot axis 15 supports a swing arm 16 connected thereto at the front portion thereof so as to be swingable with respect to the frame body 2. The swing arm 16, a motor 17 as a prime mover of the motorcycle 1 supported by the swing arm 16 and a motor driver 18 constitute a power unit 19. The rear frames 6L, 6R are provided with a rear suspension 20 being connected thereto at the upper end thereof and extend obliquely rearwardly and downwardly with the lower end of the rear suspension 20 being connected to the swing arm 16. A rear wheel 22 is connected to a shaft 21 driven by the motor 17. An ECU case 23 for storing an electronic control unit (ECU) is provided in an area extending over the upper frames 4L, 4R and the rear frames 6L, 6R. A passenger seat 24 is provided so as to cover the ECU case 23.

The frame body 2 is formed into a cradle shape, that is, a cage shape as a whole by the above-described frames. A fuel cell 25, a voltage control unit (VCU) 26, a water pump 27, an ion exchanger 28, a supercharger 29, a humidifier 30, a vapor-liquid separator 31 and a dilution box 32, an air flow sensor 33 and a thermostat 34 are provided in an equipment mounting area surrounded by the cage-shaped body frame 2. The supercharger 29 is rotated by a supercharger motor 29a.

As a detailed example of layout, the water pump 27 is arranged in an upper front portion in the frame body 2, the supercharger 29 and the humidifier 30 are arranged in the lower center portion thereof, and the VCU 26 is arranged above the supercharger 29 and the humidifier 30. The fuel cell 25 is stored in the rearmost portion of the frame body 2, that is, at a portion immediately before the pivot axis 15 in the lower portion of the ECU case 23. The fuel cell 25 has an appearance of a rectangular shape in side view, and is installed with the longitudinal side of the rectangle oriented in the vertical direction. The vapor-liquid separator 31 and the dilution box 32 are provided below the fuel cell 25.

A radiator 35 for cooling water for the fuel cell 25 is provided in the front portion of the frame body 2, and an air cleaner 36 and a reservoir tank 37 for the radiator 35 are provided so as to surround the upper portion of the head pipe 3.

The VCU 26 controls the voltage of a power generated by the fuel cell 25, the water pump 27 circulates cooling water in a cooling system, and the ion exchanger 28 removes ion in the cooling water to prevent ground fault of the fuel cell 25. The supercharger 29 compresses reaction gas, that is, air. The humidifier 30 exchanges water content between reaction gas supplied to the fuel cell 25 and used reaction gas discharged from the fuel cell 25. The vapor-liquid separator 31 collects water content generated by a predetermined expansion action or the like in excessive hydrogen gas which is not used for reaction. The dilution box 32 dilutes purged hydrogen gas with the used reaction gas, the air flow sensor 33 detects the amount of air which flows in, and the thermostat 34 switches a circulation path of the cooling water during warming up and at supercooling.

An exhaust pipe 38 formed of flexible material such as heat-resistant rubber or the like is connected to the dilution box 32. The exhaust pipe 38 extends obliquely upwardly toward the rear to a position close to the pivot axis 15, and then extends slightly downwardly toward the rear of the vehicle body. A muffler 39 is provided at a midsection of the exhaust pipe 38. The exhaust pipe 38 passes through the casing of the power unit 19, and an exit 38a projects rearwardly from the power unit 19 at the widthwise center of the vehicle body so as to be inclined slightly downwardly. The exhaust pipe 38 discharges exhaust air of the fuel cell 25 out of the vehicle body. However, since water generated in the fuel cell 25 also enters into the exhaust pipe 38 and is discharged with the exhaust air, the exhaust pipe 38 also serves as a drainage pipe, and the exit 38a also serves as a drainage port. In other words, the exhaust pipe 38 is a pipe member which also serves as the drainage pipe for draining water generated in the fuel cell 25, the exhaust pipe 38 simultaneously means the drainage pipe.

A head light 40 is arranged so as to surround the air cleaner 36. The head light 40 is arranged concentrically with an air passage for taking air from the air cleaner 36, and includes an annular lamp 40a supported by a supporting pipe 41 joined to the head pipe 3 and a light-emitting unit 40b attached to the lamp 40a. The light-emitting unit 40b may be composed of a plurality of light-emitting diodes arranged in an annular shape along the shape of the lamp 40a.

A tail light 42 formed into an annular shape which is a similar shape to the head light is provided at the rear portion of the vehicle body. The tail light 42 includes a lamp 42a and a light-emitting unit 42b. The light-emitting unit 42b may be composed of a plurality of light-emitting diodes arranged in an annular shape along the shape of the lamp 42a.

A seat back 43 for a fellow passenger is attached to the rear upper sub-frames 7L, 7R which hold the gas cylinders 10L, 10R. The seat back 43 is provided so as to be capable of being folded forward along the seat 24 by a bearing portion 44 which is joined to the rear upper sub-frames 7L, 7R.

Figure 5:
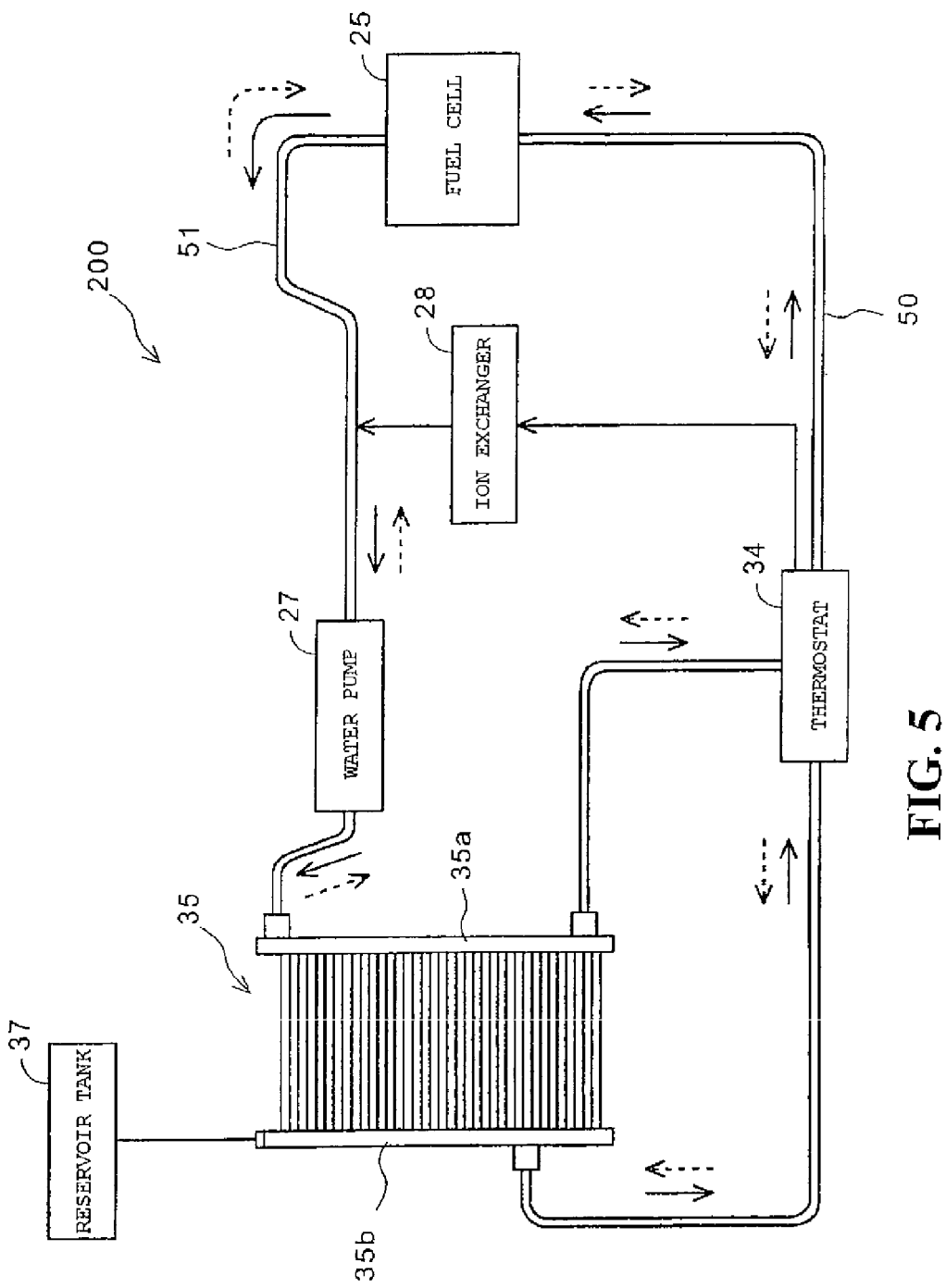
FIG. 5 is a block diagram illustrating a cooling system of the fuel cell.

Subsequently, a system of generating electricity by the fuel cell will be described. FIG. 5 illustrates a cooling system of the fuel cell 25. A cooling system 200 constitutes a path for allowing circulation of cooling medium which has cooled the fuel cell 25 to the radiator 35. A cooling water introducing pipe 50 is connected to the lower surface of the fuel cell 25 via a cooling water introducing portion, and a cooling water drainage pipe 51 is connected to a cooling water exit on the upper surface thereof. The cooling water drainage pipe 51 includes a downwardly inclined portion provided from the upper portion of the fuel cell 25 toward the radiator 35 at the front portion of the vehicle body, and the end portion thereof is connected to the water pump 27. The water pump 27 is further connected to a first tank 35a of the radiator 35 at the upper portion of the radiator 35. Since the cooling water drainage pipe 51 has the downwardly inclined portion, air bubbles generated in the fuel cell 25 are apt to be trapped in the upper portion of the inclined portion. Thus, the air bubbles are advantageously discharged from a vent hole provided at the cooling water exit of the fuel cell 25 with ease.

The cooling water introducing pipe 50 is connected to a second tank 35b of the radiator 35 via the thermostat 34. The thermostat 34 has four ports, with one of the two ports to which the cooling water introducing pipe 50 is not connected is connected to the cooling water drainage pipe 51 via the ion exchanger 28, and the other one is connected to the first tank 35a at the lower portion of the radiator 35. When starting the engine where the temperature of the cooling water is low, the thermostat 34 is connected to the water pump 27 via the first tank 35a to allow a circulation of the cooling water while bypassing the radiator 35 so that the generation efficiency at the time of a warming-up operation is improved. During normal operation after the warming-up operation, the cooling water introducing pipe 50 is connected to the second tank 35b of the radiator 35 via the thermostat 34, so that cooling water cooled by the radiator 35 is circulated to the fuel cell 25.

Figure 6:
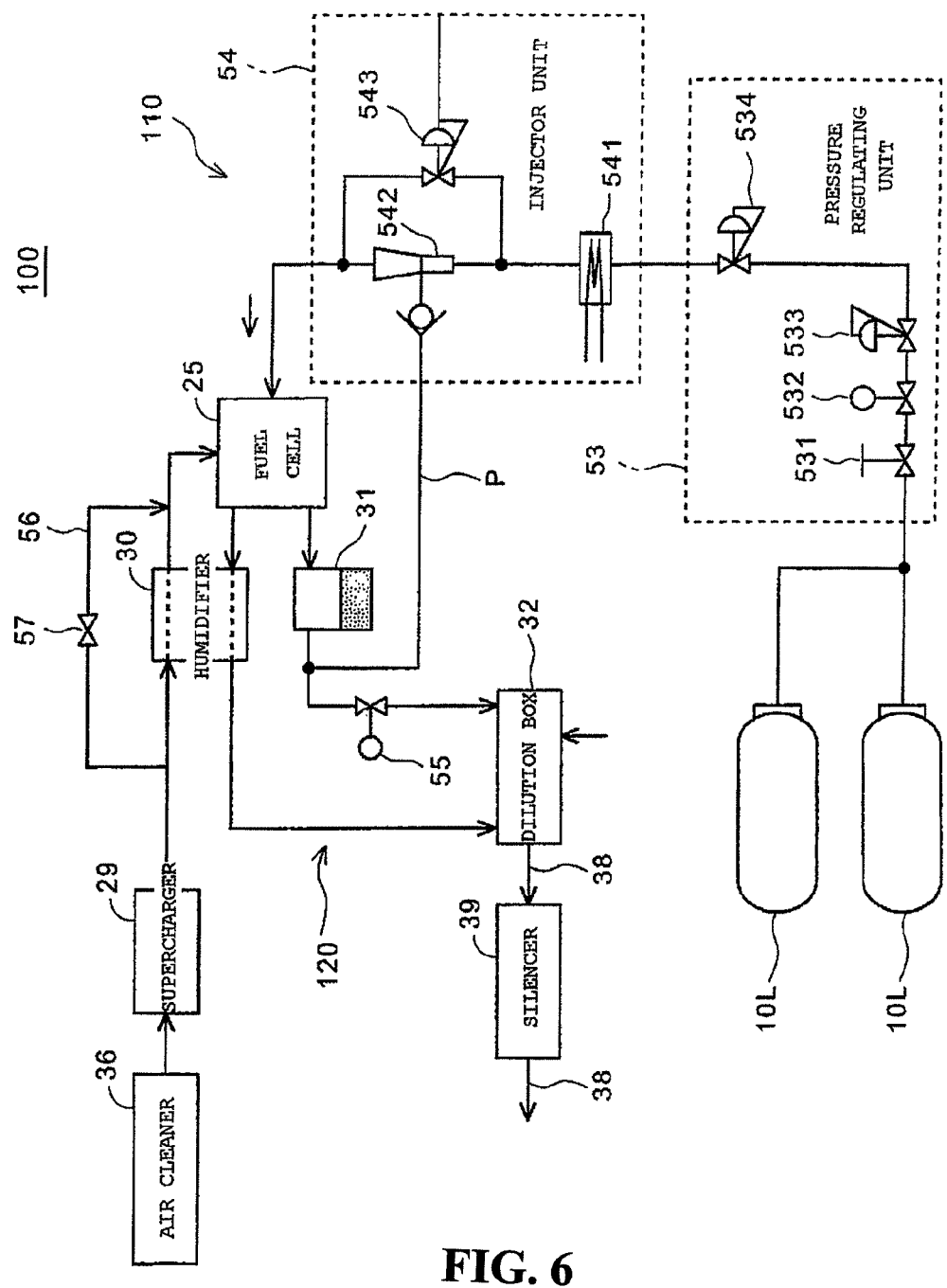
FIG. 6 illustrates a system of supplying hydrogen gas to the fuel cell.

FIG. 6 illustrates a system of supplying hydrogen gas to the fuel cell. A hydrogen gas supply system 100 includes a hydrogen gas supply unit 110 for supplying high-pressure hydrogen gas filled in the gas cylinders 10L, 10R to the fuel cell 25 and an excessive gas circulating unit 120 for circulating excessive hydrogen gas after having been used for generation in the fuel cell 25 to the fuel cell 25 for reuse.

The hydrogen gas supply unit 110 includes the gas cylinders 10L, 10R, a pressure regulating unit 53 and an injector unit 54. The excessive gas circulating unit 120 includes the supercharger 29, the humidifier 30, the vapor-liquid separator 31, the dilution box 32 and the muffler 39 provided on the exhaust pipe 38.

The pressure of the high-pressure hydrogen gas filled in the gas cylinders 10L, 10R is regulated to a supply pressure with respect to the injector unit 54 by a manual valve 531 included in the pressure regulating unit 53, an electromagnetic shut-off valve 532, a first regulator 533, a second regulator 534 and so on. The pressure-regulated hydrogen gas is cooled in a heat-exchanger 541 of the injector unit 54. The injector unit 54 includes an injector 542 and a pressure-difference regulator 543, and hydrogen gas is regulated to a predetermined pressure with respect to the pressure of the air-side by the pressure-difference regulator 543. The injector 542 sucks not only new hydrogen gas, but also unreacted hydrogen gas from the vapor-liquid separator 31 with a negative pressure and introduces the same to the fuel cell 25.

The hydrogen gas after having been used for generation in the fuel cell 25 is introduced to the vapor-liquid separator 31 as humid excessive gas. The vapor-liquid separator 31 separates and extracts water content from the supplied hydrogen gas, and unreacted hydrogen gas after having extracted the water content is circulated to the injector 542 via a return pipe P.

Part of generated water in the fuel cell 25 is introduced into the humidifier 30 as vapor together with air (off gas) discharged from the fuel cell 25, is taken from the air cleaner 36, and is used for humidifying new air (oxidizer gas) compressed in the supercharger 29. The humidified air is introduced into the fuel cell 25.

The hydrogen gas, separated into vapor and liquid and extracted by the vapor-liquid separator 31, is circulated to the fuel cell 25 for reuse. However, since repetitive reuse results in high density of impurity, it is discharged from time to time using an electromagnetic valve 55. The discharged hydrogen gas is introduced into the dilution box 32, and is diluted by the off-gas from the fuel cell 25 introduced into the dilution box 32 via the humidifier 30. The diluted hydrogen gas is discharged to the air via the silencer 39.

A bypass 56 for supplying the air compressed by the supercharger 29 to the fuel cell 25 while bypassing the humidifier 30 is provided. Air can be directly supplied to the fuel cell 25 from the bypass 56 by opening a bypass valve 57 for warming up the fuel cell 25 quickly at the time of cold start.

In this configuration, in the fuel cell 25, electrons are separated from hydrogen supplied from the gas cylinders 10L, 10R by means of a fuel pole (minus pole), and the hydrogen ion having separated the electrons passes through electrolyte and is moved to an air pole (plus pole). On the other hand, a circuit is provided for allowing the electrons separated from hydrogen to return to the air pole, and the oxygen in the air and returned electrons react at the air pole to generate water vapor. With this reaction, electrons are continuously moved in an external circuit and electric current flows. The motor 17 is provided in the external circuit. Electric power generated in the fuel cell 25 is stored, for example, in a battery 48 (see FIG. 3) arranged so as to be elongated in the vertical direction with the intermediary of the front fork 14 once, and is supplied to the motor 17.

As described above, in this embodiment, the exhaust pipe 38 for off-gas is extended rearwardly of the vehicle body for discharging the off-gas from the widthwise center of the vehicle body. Therefore, water content contained in the discharged air is prevented from falling on a tire or a passenger's leg. The exhaust pipe 38 is not limited to the one which is passed through the interior of the power unit 19. In a motorcycle having a power unit of a type which supports the rear wheel with a cantilevered swing arm for example, the exhaust pipe 38 may be extended along the vehicle body on the side where the power unit is not provided and bent so that the distal end portion, that is, the exit 38a is positioned at the widthwise center of the vehicle body. The present invention is not limited to a configuration in which the exit 38a is arranged at the widthwise center of the vehicle body, as long as the exit 38a of the exhaust pipe 38 projects rearwardly of the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell motorcycle driven by a motor using electric power generated in a fuel cell as a power source, comprising:
the fuel cell being arranged forwardly of a rear wheel and within a body frame of the motorcycle;
a power unit for supporting the motor, said power unit being supported so as to be capable of swinging in a vertical direction with respect to the body frame of the motorcycle;
a drainage pipe connected to the fuel cell for draining out water generated in an interior of the fuel cell and extending through an interior of the power unit, and
a muffler provided at a midsection of the drainage pipe and stored in the power unit,
wherein said drainage pipe extends rearwardly of the motorcycle and terminates in a drainage port which is disposed at the level of the power unit and in a position behind the rear wheel and extends downwardly at the widthwise center of the motorcycle so that discharged water from the muffler is directed away from the rear wheel and legs of the driver.

2. The fuel cell motorcycle according to claim 1, wherein the drainage pipe is formed of a flexible material.

3. The fuel cell motorcycle according to claim 2, wherein the flexible material is a heat-resistant rubber.

4. The fuel cell motorcycle according to claim 1, wherein the drainage pipe is an exhaust pipe operatively connected to said fuel cell for draining water generated in the interior of the fuel cell away from the operator of the motorcycle.

5. The fuel cell motorcycle according to claim 1, wherein the drainage pipe is an exhaust pipe that extends obliquely upwardly toward the rear and then extends slightly downwardly towards the rear of the vehicle.

6. A fuel cell motorcycle driven by a motor using electric power comprising:
- a fuel cell as a power source, said fuel cell being arranged forwardly of a rear wheel;
- a power unit containing a swing arm for a motor driver for swinging in a vertical direction with respect to a body frame of the motorcycle;
- a drainage pipe connected to the fuel cell for draining out water generated in an interior of the fuel cell and extending through an interior of the motor driver, said drainage pipe extending rearwardly of the motorcycle and terminating in a drainage port which is disposed at the level of the power unit in a position behind the rear wheel and extending downwardly at the widthwise center of the motorcycle, and
- a muffler is provided at a midsection of the drainage pipe and stored in the power unit.

7. The fuel cell motorcycle according to claim 6, wherein the drainage pipe is formed of a flexible material.

8. The fuel cell motorcycle according to claim 7, wherein the flexible material is a heat-resistant rubber.

9. The fuel cell motorcycle according to claim 6, wherein the drainage pipe is an exhaust pipe operatively connected to said fuel cell for draining water generated in the interior of the fuel cell away from the operator of the motorcycle.

10. The fuel cell motorcycle according to claim 6, wherein the drainage pipe is an exhaust pipe that extends obliquely upwardly toward the rear and then extends slightly downwardly towards the rear of the vehicle.

11. A fuel cell motorcycle driven by a motor using electric power comprising:
- a fuel cell as a power source, said fuel cell being arranged forwardly of a rear wheel;
- a power unit containing a swing arm for a motor driver for swinging in a vertical direction with respect to a body frame of the motorcycle; and
- a drainage pipe connected to the fuel cell for draining out water generated in an interior of the fuel cell, said drainage pipe extending rearwardly of the motorcycle at the level of the power unit and terminating in a drainage port which is disposed at the level of the power unit in a position behind the rear wheel and extending downwardly at the widthwise center of the motorcycle, and
- a muffler is provided at a midsection of the drainage pipe and stored in the power unit.

12. The fuel cell motorcycle according to claim 11, wherein the drainage pipe is formed of a flexible material.

13. The fuel cell motorcycle according to claim 12, wherein the flexible material is a heat-resistant rubber.

14. The fuel cell motorcycle according to claim 11, wherein the drainage pipe is an exhaust pipe operatively connected to said fuel cell for draining water generated in the interior of the fuel cell away from the operator of the motorcycle.

15. The fuel cell motorcycle according to claim 11, wherein the drainage pipe is an exhaust pipe that extends obliquely upwardly toward the rear and then extends slightly downwardly towards the rear of the vehicle.

\* \* \* \* \*